(No Model.)

L. PLATT & W. McCLOUD.
Milk Setting and Skimming Apparatus.

No. 237,999.          Patented Feb. 22, 1881.

Witnesses
Thos H Hutchins
Wm J. Hutchins

Inventors
Levi Platt
Wallace McCloud

United States Patent Office.

LEVI PLATT AND WALLACE McCLOUD, OF PLATTVILLE, ILLINOIS.

MILK SETTING AND SKIMMING APPARATUS.

SPECIFICATION forming part of Letters Patent No. 237,999, dated February 22, 1881.

Application filed October 28, 1880. (No model.)

*To all whom it may concern:*

Be it known that we, LEVI PLATT and WALLACE McCLOUD, of Plattville, in Kendall county, and State of Illinois, have invented a Device for Setting and Skimming Milk, the construction and operation of which we will proceed to explain, reference being had to the annexed drawings, making a part of this specification, in which—

Figure 1:
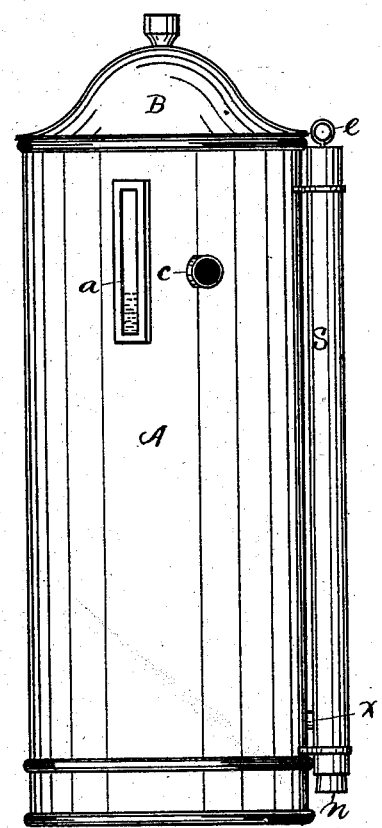
Figure 2:
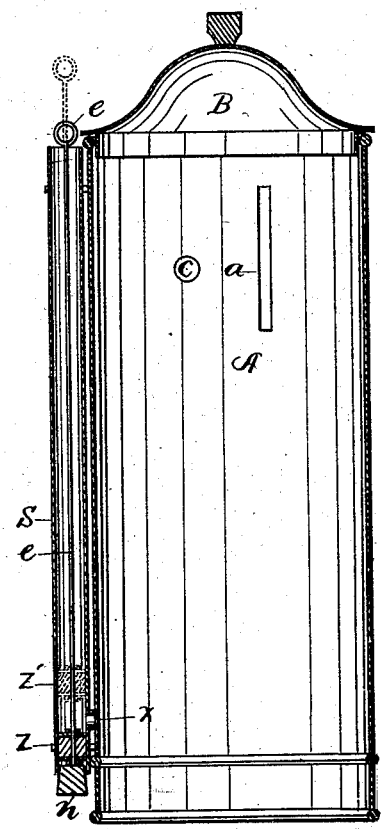

Figure 1 is a front elevation, and Fig. 2 a vertical sectional view through the center.

The nature and object of this invention are to separate the cream from off the top of the milk by letting it run off itself, without using a skimmer to skim it off, by means of elevating the milk from the bottom by injecting a body of water under it to raise it up and let the cream run off through an aperture in the side of the receptacle near the top.

In the drawings, A represents the receptacle for holding the milk to be set for cream, having the lid B at the top, and the exterior tube, S, with the opening $x$, for communication between the tube S and the receptacle A. The lower end of the tube S is provided with a stopper, $n$, which may be removed when it is desired to discharge milk from that place or to clean out the tube S. The tube S is also provided with a plunger or piston, $e$, having a water-tight piston-head, $z$, which operates up and down in the tube S. The receptacle A is also provided with a transparent opening, $a$, on one side to see the height of the milk inside, also with a discharge-opening at one side, at C, through which the cream is discharged.

The mode of operation is substantially as follows: The piston $e$ is forced down until the piston-head closes the aperture $x$, so that water cannot pass from the tube S into the receptacle A or milk from the receptacle A into the tube S, the stopper $n$ having first been removed. This having been done, the tube S is filled with water to the top and the receptacle A with milk up to near the discharge C, as shown by the dotted lines in Fig. 1. After the milk has set the required length of time and the cream has accumulated on the top of the milk, and it is desired to remove it, the piston-head $z$ is forced below the opening $x$, so the communication will be free between the receptacle A and tube S. More water is then poured into the top of the tube S until the column of milk in the receptacle A is raised the required height to discharge the cream at the discharge C, thus saving the labor of skimming it off. However, the receptacle A may be filled with milk above the discharge C, which may be closed with a stopper, but not so high as to be above a line with the top of the tube S. In such case, when the cream forms from one to three or four inches thick on the top of the milk, varying in density from the top downward, the height of the milk can be regulated by discharging some of it at the lower end of the tube S, or raised in the manner described until the lower part of the cream is opposite the discharge C, when the stopper of the discharge can be removed and all of the cream run out.

The piston $z$ is only intended to be elevated above the aperture $x$ when it is desired to draw off milk through the tube S after removing the stopper $n$.

The tube S is intended always to run up to the top of or a little above the receptacle A, and a quantity of water poured into its upper end will displace an equal quantity of milk in the receptacle A and cause it to discharge at the discharge-opening C, as before stated.

Having thus described our invention, what we claim as new, and desire to secure by Letters Patent, is as follows, to wit:

In a milk-setter, the combination and arrangement of the receptacle A, external tube, S, plunger $e$, piston-head $z$, stopper $n$, discharge-opening C, and aperture $x$, all arranged to operate in the manner and for the purpose set forth.

LEVI PLATT.
WALLACE McCLOUD.

Witnesses:
WM. L. GINN,
THOMAS NEWTON.